United States Patent
Escobar et al.

(10) Patent No.: US 8,704,499 B2
(45) Date of Patent: Apr. 22, 2014

(54) METHOD AND ARRANGEMENT FOR TRACKING THE MAXIMUM POWER POINT OF A PHOTOVOLTAIC MODULE

(75) Inventors: Gerardo Escobar, Dättwil-Baden AG (CH); Tuomas Pulli, Espoo (FI); Matti Karppanen, Espoo (FI)

(73) Assignee: ABB Research Ltd., Zurich (CH)

( * ) Notice: Subject to any disclaimer, the term of this patent is extended or adjusted under 35 U.S.C. 154(b) by 179 days.

(21) Appl. No.: 13/232,544

(22) Filed: Sep. 14, 2011

(65) Prior Publication Data

US 2012/0069602 A1    Mar. 22, 2012

(30) Foreign Application Priority Data

Sep. 21, 2010 (EP) .................................... 10177842

(51) Int. Cl.
*G05F 1/00* (2006.01)
(52) U.S. Cl.
USPC ........................................ 323/222; 323/906
(58) Field of Classification Search
USPC .................... 323/222–225, 282–286, 906
See application file for complete search history.

(56) References Cited

U.S. PATENT DOCUMENTS

| | | | | |
|---|---|---|---|---|
| 4,375,662 A * | 3/1983 | Baker | ................................ | 363/95 |
| 4,604,567 A * | 8/1986 | Chetty | ............................ | 323/299 |
| 5,268,832 A * | 12/1993 | Kandatsu | .......................... | 363/95 |
| 5,869,956 A | 2/1999 | Nagao et al. | | |
| 7,940,032 B2 * | 5/2011 | Kim et al. | ...................... | 323/283 |
| 8,013,474 B2 * | 9/2011 | Besser et al. | ...................... | 307/99 |
| 8,093,872 B2 * | 1/2012 | Kiamilev et al. | .............. | 323/222 |
| 8,159,178 B2 * | 4/2012 | Serban | ............................ | 320/101 |
| 8,193,757 B2 * | 6/2012 | Chen et al. | ...................... | 320/101 |

(Continued)

FOREIGN PATENT DOCUMENTS

| | | |
|---|---|---|
| CN | 101105697 A | 1/2008 |
| CN | 201084042 Y | 7/2008 |
| CN | 101651436 A | 2/2010 |
| EP | 2 110 729 A1 | 10/2009 |

OTHER PUBLICATIONS

Casadei et al., "Single-Phase Single-Stage Photovoltaic Generation System Based on a Ripple Correlation Control Maximum Power Point Tracking" IEEE Transactions on Energy Conversion, (2006), vol. 21, No. 2, pp. 562-568.

(Continued)

*Primary Examiner* — Timothy J Dole
*Assistant Examiner* — Yusef Ahmed
(74) *Attorney, Agent, or Firm* — Buchanan Ingersoll & Rooney PC

(57) ABSTRACT

A method and apparatus of tracking the maximum power point of a photovoltaic module. The method includes measuring an output voltage of the photovoltaic module, determining an output voltage of the inverter connected to the photovoltaic module, and measuring output current of the inverter connected to the photovoltaic module. A variable relating to energy of the capacitor is defined using the measured PV module output voltage, and a second harmonic component is extracted from the defined variable. A second harmonic component of the module output power is estimated using the defined variable, measured output current of the inverter, and the determined output voltage of the inverter. The estimated and extracted second harmonic components are multiplied, and a DC component is extracted from the product. A control signal for controlling the inverter connected to the photovoltaic module is formed by using the extracted DC component in a PI algorithm.

20 Claims, 11 Drawing Sheets

(56) References Cited

U.S. PATENT DOCUMENTS

| | | | |
|---|---|---|---|
| 8,390,261 B2* | 3/2013 | Deboy | 323/224 |
| 2009/0115393 A1* | 5/2009 | Yoshida et al. | 323/300 |
| 2010/0236612 A1* | 9/2010 | Khajehoddin et al. | 136/252 |
| 2011/0130889 A1* | 6/2011 | Khajehoddin et al. | 700/298 |
| 2011/0276195 A1* | 11/2011 | Macerini et al. | 700/298 |

OTHER PUBLICATIONS

Kasa et al., "Flyback Inverter Controlled by Sensorless Current MPPT for Photovoltaic Power Systems" IEEE Transactions on Industrial Electronics, (2005), vol. 52, No. 4, pp. 1145-1152.

Itako et al., "A New Current Sensorless MPPT Control Method for PV Generation Systems" European Conference on Power Electronics and Applications, (2005), 9 Pages.

Veerachary et al., "$V^2$-based Power Tracking for Nonlinear PV Sources" IEE Proceedings Electric Power Application, (2005), vol. 152, No. 5, pp. 1263-1270.

Zhou et al., "A Novel Model for Photovoltaic Array Performance Prediction" Applied Energy, (2007), vol. 84, No. 12, pp. 1187-1198.

Cavalcanti et al., "Maximum Power Point Tracking Techniques for Photovoltaic Systems".

Esram et al., "Comparison of Photovoltaic Array Maximum Power Point Tracking Techniques" IEEE Transactions on Energy Conversion, (2007), vol. 22, No. 2, pp. 439-449.

Koutroulis et al., "Development of a Microcontroller-Based, Photovoltaic Maximum Power Point Tracking Control System" IEEE Transactions on Power Electronics, (2001), vol. 16, No. 1, pp. 46-54.

Pandey et al., "High-Performance Algorithms for Drift Avoidance and Fast Tracking in Solar MPPT System" IEEE Transactions on Energy Conversion, (2008), vol. 23, No. 2, pp. 681-689.

Sera et al., "Optimized Maximum Power Point Tracker for Fast-Changing Environmental Conditions" IEEE Transactions on Industrial Electronics, (2008), vol. 55, No. 7, pp. 2629-2637.

Miyatake et al., "Control Characteristics of a Fibonacci-Search-based Maximum Power Point Tracker When a Photovoltaic Array is Partially Shaded" The 4th International Power Electronics and Motion Control Conference, 2004., IPEMC (2004), vol. 2, pp. 816-821.

Kim et al., "A Novel Maximum Power Point Tracking Control for Photovoltaic Power System under Rapidly Changing Solar Radiation" IEEE International Symposium on Industrial Electronics, (2001), Proceedings, ISIE 2001, vol. 2, pp. 1011-1014.

Sullivan et al., "A High-Efficiency Maximum Power Point Tracker for Photovoltaic Arrays in a Solar-Powered Race Vehicle" 24th Annual IEEE Power Electronics Specialists Conference, (1993), PESC '93 Record., pp. 574-580.

Extended Search Report dated Mar. 17, 2011, issued in the corresponding European Application No. 10177842.1-1239.

Chinese Office Action dated Jul. 15, 2013, issued by the State Intellectual Property Office, P.R. China in corresponding Chinese Patent Application No. 201110288698.8, and English language translation of Office Action. (13 pages).

\* cited by examiner

METHOD AND ARRANGEMENT FOR TRACKING THE MAXIMUM POWER POINT OF A PHOTOVOLTAIC MODULE

RELATED APPLICATION

This application claims priority under 35 U.S.C. §119 to European Patent Application No. 10177842.1 filed in Europe on Sep. 21, 2010, the entire content of which is hereby incorporated by reference in its entirety.

FIELD

The present disclosure relates to photovoltaic cells, such as, a method and an arrangement for tracking the maximum power point (MPP) of a photovoltaic cell or module. More specifically, the disclosure relates to a method and an arrangement with which the maximum power point can be tracked fast and accurately in single-phase photovoltaic applications without measurement of output current from the photovoltaic cell or module and in environments where the irradiation and temperature of the cell changes rapidly.

BACKGROUND INFORMATION

Known photovoltaic (PV) cells, modules or arrays to use a maximum power point tracker (MPPT) to ensure that the maximum available power is extracted from the irradiated cells.

Known MPPT methods deliver a reference for the PV voltage, which is later used in a limited bandwidth proportional plus integral (PI) controller to generate the amplitude of the grid-side current reference.

FIG. 1 shows i-v and p-v curves of a PV panel in accordance with known systems. As shown in FIG. 1, the voltage and current output characteristic of a photovoltaic cell or module can be represented in the form of i-v or p-v curves. The i-v curve is the curve that starts at i=1 and ends at v=1, and the p-v curve is the curve having a maximum point when voltage $v=V_{MPP}$.

Various electrical characteristics of PV panels are presented in FIG. 1. FIG. 1 shows the short circuit current ($I_{SC}$), which is the maximum value of current cell can generate, and it is produced under short-circuit conditions (v=0 V). Open circuit voltage ($V_{OC}$) corresponds to the highest value of voltage generated in open circuit conditions (i=0 A). Further, FIG. 1 shows the maximum power point (MPP), which is the operating point (voltage $V_{MPP}$ and current $I_{MPP}$) where the PV cell produces the maximum power ($P_{MPP}=V_{MPP} \cdot I_{MPP}$).

The relationship between voltage and current can be expressed as the following implicit static nonlinearity $$i = I_{SC}\left[1 - \exp\left(\frac{v - V_{OC} + R_S \cdot i}{V_T}\right)\right] \quad (1)$$

where $V_T$ is referred to as the thermal voltage, which is calculated according to the Boltzmann constant (K=1.38·10$^{-23}$ J/K), magnitude of electron charge (q=1.6·10$^{-19}$ C), PV temperature (T=(K)), idealizing factor (1<m<2) and number of cells in series (N), according to $$V_T = \frac{mNKT}{q};$$

$R_S$ is the series resistance, which depends on $V_{MPP}$, $I_{MPP}$, $V_{OC}$ and $I_{SC}$ under standard conditions and $V_T$.

The previous expression (1) can be further reduced if $R_S \ll 1$ $$i = I_{SC}\left[1 - \exp\left(\frac{v - V_{OC}}{V_T}\right)\right] \quad (2)$$

It should be noted that current i=i(v) is a static explicit nonlinear function of the voltage, i.e., dynamics are not considered. The power delivered by the PV module can be computed simply as a product of current and voltage as follows $$p = i \cdot v \quad (3)$$

Manufacturers of photovoltaic cells and modules can provide the open circuit voltage ($V_{OC}$), the short circuit current ($I_{SC}$) and the maximum power point ($P_{MPP}=V_{MPP} \cdot I_{MPP}$) under standard test conditions (irradiance of 1000 W/m² at 25° C. cell temperature). However, these parameters, and consequently the i-v PV characteristic, can be affected by temperature and solar irradiation as shown in FIG. 2.

FIG. 2 shows the influence of (a) solar irradiance and (b) cell's temperature on the PV i-v characteristic curve in accordance with known systems. FIG. 2 shows that the open circuit voltage $V_{OC}$ varies with both irradiance and temperature. $V_{OC}$ has a negative temperature coefficient and depends logarithmically on the irradiance. FIG. 2 also shows that, although the short circuit current $I_{SC}$ changes proportionally to the irradiance, it is relatively insensitive to temperature variation.

In any case, the MPP is varying in function of such environmental conditions, and thus it is important to have a strategy to guarantee the operation of the PV module on the MPP at all times. These strategies are referred to in known PV systems as maximum power point tracking (MPPT) algorithms.

The PV panel can be forced to operate in the MPP as shown in the p-v plot of FIG. 1. This operation guarantees that the power extracted from the PV module is the maximum power available. This objective can be recast as a regulation objective that can be fulfilled if one of the following is satisfied as $t \to \infty$:

$$i \to i_{MPP}$$

$$v \to v_{MPP}$$

$$p \to P_{MPP} \quad (4)$$

where $i_{MPP}$, $v_{MPP}$ and $P_{MPP}$ are the current, voltage and power in the MPP. In the context of the present disclosure, (·)* represents the reference for (·).

In the case of single-stage inverters, as those shown in FIGS. 3 and 4, this regulation objective is achieved by modulating the amplitude of the grid-side current $i_0$. The reference for this current, referred to as P, can be generated by the MPPT algorithm. FIG. 3 shows a connection of the PV panel to the grid by means of a single-stage inverter, and controller using an indirect MPPT in accordance with known systems. FIG. 4 shows a connection of the PV panel to the grid by means of a known single-stage inverter in accordance with known systems.

FIGS. 3 and 4 illustrate a basic topology for the photovoltaic system. A solar panel, string or module 31 produces a DC voltage v. A capacitor C is connected in parallel with the panel, and the voltage from the parallel connection is fed to an inverter 32, which is presented in FIGS. 3 and 4 as a voltage source inverter (VSI). The output of the inverter is filtered with a filter 33 and fed further to the grid 34.

In known MPPT algorithms, the generation of P is performed indirectly by means of an intermediate PI controller 35 as shown in FIG. 3. As a result, the MPPT 36 generates the voltage reference $v_{Cref}$ for the PV voltage $v_C$, which is then compared to the measured $v_C$, and the difference is used by the PI controller 35 to generate the amplitude P. The control block 40 includes a synchronization block 37, which reconstructs the frequency and phase of the grid voltage for producing a desired inverter output current, and a grid control block 38, which produces a voltage reference for the modulator 39. The PI controller should be tuned to have a relatively small bandwidth to alleviate the effect of the $2^{nd}$ harmonic fluctuation. As a result, a poor dynamic response can be obtained as the response speed is considerably reduced.

The current reference can be computed from the obtained amplitude information P as $$i_0^* = \frac{P}{v_{S,RMS}^2} v_{S,1} \quad (5)$$

where $v_{S,1}$ is the fundamental component of the grid voltage, and $v_{S,RMS}$ its RMS value. Usually $v_{S,1}$ is obtained by means of an external PLL or any other synchronization process. A current control loop can be designed to guarantee that the grid-side current $i_0$ follows such a reference $i_0^*$ defined above in an accurate and fast manner.

FIG. 5 shows a connection of the PV panel to the grid by means of a known dual-stage inverter in accordance with known systems. In the case of dual-stage converters, as shown in FIG. 5, the MPPT generates the voltage reference $v_{ref}$ for the input capacitor $C_{PV}$ (PV voltage), which is then used to compute the duty ratio u in block 54 for the DC-DC converter 51. In dual-stage topologies, the output voltage of the DC-DC converter can be controlled by the inverter, while the input voltage v is controlled by the DC-DC converter. That is, the DC-DC converter 51 is responsible for guaranteeing the operation in the MPP. The amplitude P for the current reference can be generated by a PI controller 52 that guarantees the regulation of the capacitor voltage $v_C$ towards a given constant reference $v_{Cref}$. The voltage reference $v_{Cref}$ is a design parameter defined externally. The amplitude P is fed to a grid control block 55, which operates to produce a voltage reference e for producing a desired current $i_1$.

The most common MPPT algorithms are the constant voltage (CV), the perturbation and observation (P&O) and the incremental conductance (IncCond), and modifications to them. In known systems, both P&O and IncCond are based on a perturb and observe approach. This approach comprises perturbing the PV voltage by adding or subtracting a small step and then observing the resulting changes in power. A decision based on these changes is made to decrease or increase the PV voltage in the next sampling time.

From these algorithms, a reference for the PV voltage can be obtained, which is used in a PI system to generate the final control signal, such as the amplitude of the reference for the grid-side current. Both methods, P&O and IncCond, usually oscillate close to the MPP as they are based on a perturb and observe process. On the other hand, the CV has no oscillations but it rarely reaches the MPP.

In known MPPT systems, performance suffers from fluctuations under rapidly changing atmospheric conditions. It has been observed that P&O suffers from big excursions (e.g., fluctuations) in the wrong direction after rapidly changing irradiation conditions, that is, P&O fails to track the MPP effectively, while IncGond may still show good accuracy and efficiency in these conditions.

Other known MPPT methods comprise reconstructing the variation of power with respect to voltage on the PV (dp/dv) or the variation of power with respect to the duty ratio of the DC-DC converter attached to the PV (dp/dD) is used. These methods address the problem of attaching a battery charger after the DC-DC converter, which restricts the output voltage to be constant. Thus, the maximization of output power turns out to be equivalent to maximizing the output current of the DC-DC converter. Hence, the measurement of the PV voltage becomes unnecessary. Based on the known MPPT methods the PV power is no longer maximized but rather the power after the DC-DC converter is maximized, which is referred as the actual usable power.

A common drawback in known MPPT schemes concerns specifying that current be measured from the PV panel.

SUMMARY

An exemplary method of tracking a maximum power point of a photovoltaic module is disclosed. The method comprises measuring output voltage ($v_C$) of the photovoltaic module; determining output voltage (e) of an inverter connected to the photovoltaic module; measuring output current ($i_1$) of the inverter connected to the photovoltaic module; defining a variable (z) relating to energy of a capacitor using the measured PV module output voltage; extracting a second harmonic component ($\tilde{z}$) from the defined variable (z); estimating a second harmonic component ($\tilde{p}$) of module output power (p) using the defined variable (z), measured output current ($i_1$) of the inverter, and the determined output voltage (e) of the inverter; multiplying the extracted ($\tilde{z}$) and the estimated ($\tilde{p}$) second harmonic components; extracting a DC component ($\langle \tilde{p}\tilde{z} \rangle_{DC}$) from a product ($\tilde{p}\tilde{z}$) of the multiplication of the second harmonic components; and forming a control signal (P;$v_{ref}$) for controlling the inverter connected to the photovoltaic module by using the extracted DC component in a PI algorithm.

An exemplary arrangement for tracking the maximum power point of a photovoltaic module is disclosed. The arrangement comprises means for measuring output voltage ($v_C$) of the photovoltaic module; means for determining output voltage (e) of an inverter connected to the photovoltaic module; means for measuring output current ($i_1$) of the inverter connected to the photovoltaic module; means for defining a variable (z) relating to energy of a capacitor using the measured PV module output voltage; means for extracting a second harmonic component ($\tilde{z}$) from the defined variable (z); means for estimating a second harmonic component ($\tilde{p}$) of module output power (p) using the defined variable (z), measured output current ($i_1$) of the inverter and the determined output voltage (e) of the inverter; means for multiplying the extracted ($\tilde{z}$) and the estimated ($\tilde{p}$) second harmonic components; means for extracting a DC component ($\langle \tilde{p}\tilde{z} \rangle_{DC}$) from a product ($\tilde{p}\tilde{z}$) of the multiplication of the second harmonic components; and means for forming a control signal (P;$v_{ref}$) for controlling the inverter connected to the photovoltaic module by using the extracted DC component in a PI algorithm.

An exemplary method of tracking a maximum power point of a photovoltaic module is disclosed. The method comprising measuring output voltage ($v_C$) of the photovoltaic module; determining output voltage (e) of an inverter connected to the photovoltaic module; measuring output current ($i_1$) of the inverter connected to the photovoltaic module; defining a variable (z) relating to energy of a capacitor using the measured PV module output voltage; processing the defined variable (z), measured output current ($i_1$) of the inverter, and the determined output voltage (e) of the inverter to obtain second harmonic components ($\tilde{z}$), ($\tilde{p}$) of the defined variable and module output power (p), respectively; extracting a DC component ($\langle \tilde{p}\tilde{z} \rangle_{DC}$) from a product ($\tilde{p}\tilde{z}$) of the second harmonic components; and forming a control signal (P;$v_{ref}$) for controlling the inverter connected to the photovoltaic module based on the extracted DC component.

BRIEF DESCRIPTION OF THE DRAWINGS

In the following, the disclosure will be described in greater detail by means of exemplary embodiments with reference to the attached drawings, in which.

Figure 1:
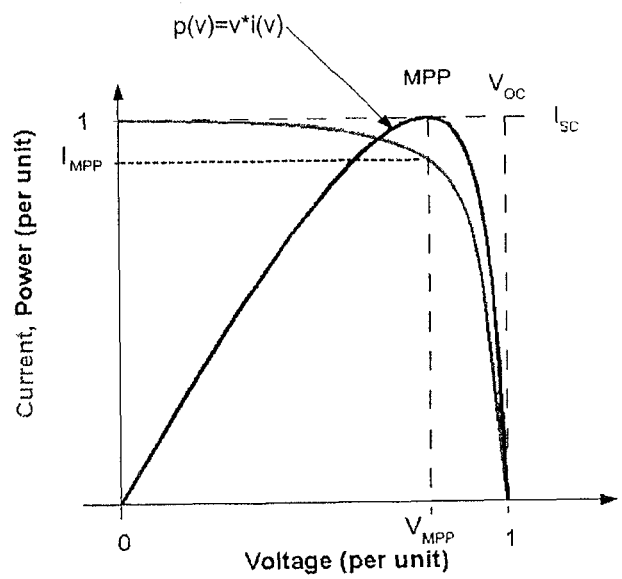
FIG. 1 shows i-v and p-v curves of a PV panel in accordance with known systems.
Figure 2:
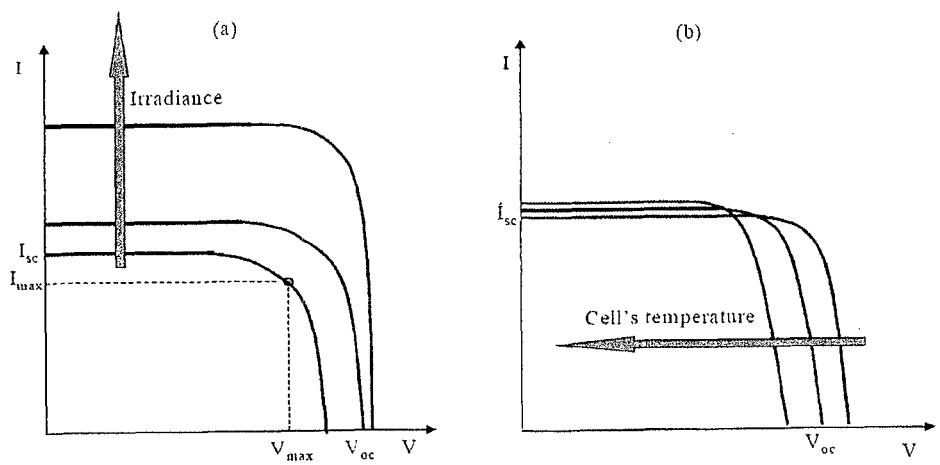
FIG. 2 shows the influence of (a) solar irradiance and (b) cell's temperature on the PV i-v characteristic curve in accordance with known systems.
Figure 3:
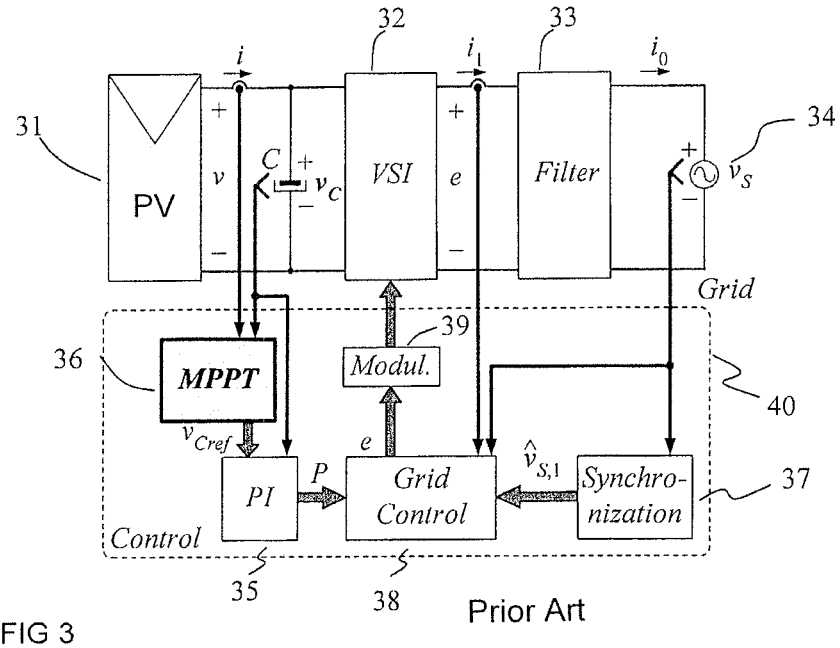
FIG. 3 shows a connection of the PV panel to the grid by means of a single-stage inverter, and controller using an indirect MPPT in accordance with known systems.

in accordance with an exemplary embodiment.

DETAILED DESCRIPTION

The disclosure is based on estimating the derivative of power from the cell as a function of voltage of the cell. Further the power from the cell is not calculated based on the direct measurement of current from the cell, instead, the power is reconstructed from signals measured from the AC side of the inverter of the system. Especially harmonic components of the PV voltage and estimated power are used in the MPP tracker.

In contrast to known maximum power point trackers (MPPT) systems, exemplary methods of the present disclosure do not follow the perturbation and observation approach. Instead, exemplary methods described herein use the information on the gradient of power with respect to the PV voltage to establish the amplitude of the grid-side current, which, in turn, guarantees convergence of state trajectories towards the MPPT. Exemplary methods and systems of the present disclosure are thus referred to as a current sensorless direct gradient maximum power point tracker "DG-MPPT-iless".

Known MPPT systems deliver a reference for the PV voltage, which is later used in a limited bandwidth proportional plus integral (PI) controller to generate the amplitude of the grid-side current reference. In contrast, the present method delivers the amplitude directly, thus naturally guaranteeing a considerably faster response.

An exemplary DG-MPPT-iless for the single-stage topology of the present disclosure can directly deliver the power reference P, which is used as the modulation amplitude to build the grid side current reference. In addition, it can be re-structured to deliver a PV voltage reference as in known methods. This reference is then used in an additional PI controller to generate P.

The exemplary methods and systems of the present disclosure do not specify measurement of the PV current normally used to generate the PV power signal, thus reducing the number of sensors. Instead, estimators have been designed to recover information provided by the PV power. The design of the estimators is based on the structure of the system mathematical model, and uses information available on the AC side of the inverter.

The exemplary DG-MPPT-iless for the single-stage topology of the present disclosure is not based on the perturbation and observation concept, therefore very small ripple is expected in the generation of the modulation amplitude P. This has the additional advantage of producing a cleaner grid side current.

The exemplary DG-MPPT-iless utilizes phase information of needed signals for tracking the MPP of a PV module and hence the absolute amplitude of the signals is not needed. This is very useful for the simplification of the method in practical implementation. In addition, variations e.g. in capacitance of the input capacitor interfacing PV module or losses of the inverter stage do not affect the performance of the method significantly.

In an exemplary embodiment of the present disclosure an MPPT controller can be developed with a PV current measurement using the information of the derivative of power p as a function of $v_C$, $$i.e. \frac{dp}{dv_c}.$$

The derivative $$\frac{dp}{dv_c}$$

represents the slope of the p-v characteristic curve. The derivative is exactly zero at $v_C = v_{MPP}$, it is positive for $v_C < v_{MPP}$, and negative for $v_C > v_{MPP}$.

Figure 4:
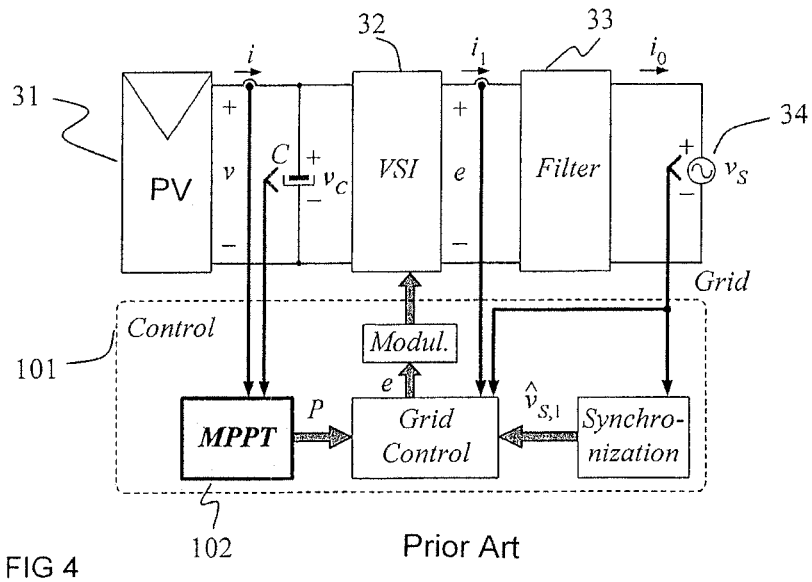
FIG. 4 shows a connection of the PV panel to the grid by means of a single-stage inverter in accordance with known systems.
Figure 5:
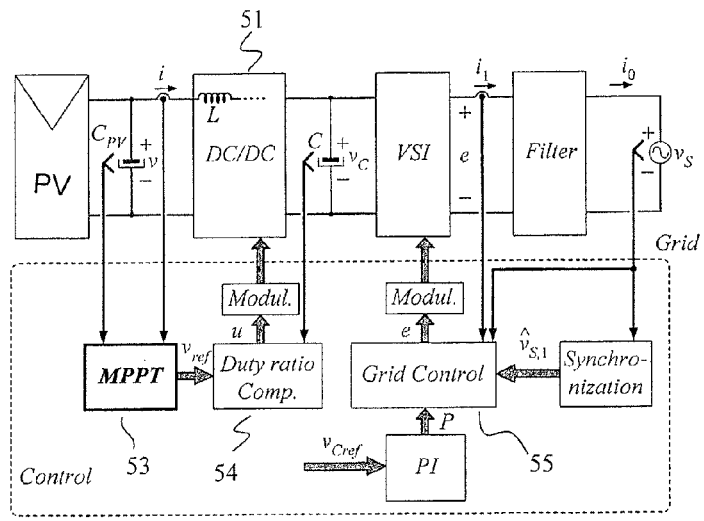
FIG. 5 shows a connection of the PV panel to the grid by means of a dual-stage inverter in accordance with known systems.
Figure 6:
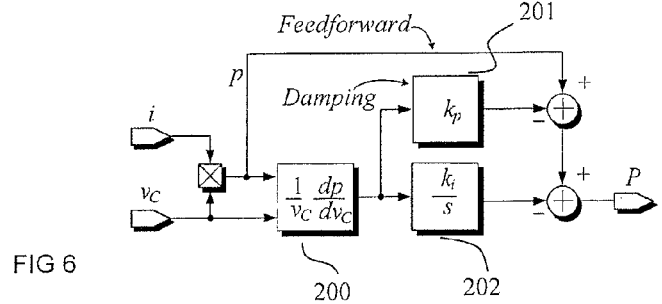
FIG. 6 shows a direct regulation controller DG-MPPT for the single-stage inverter in accordance with an exemplary embodiment.

As with known methods shown in FIG. 4, both current from the photovoltaic panel and capacitor voltage are measured. These measured values are fed to a control block 101, and more specifically to a maximum power point tracker MPPT 102. FIG. 6 shows a direct regulation controller DG-MPPT for the single-stage inverter in accordance with an exemplary embodiment. FIG. 6 shows the basic structure of the MPPT having the measured current and capacitor voltage as inputs.

As shown in FIG. 6, the measured current and voltage can be multiplied, and the obtained product, representing power, is fed to a derivative block 200 together with the measured capacitor voltage. The block 200 calculates the above-mentioned derivative and further divides the derivative by the measured capacitor voltage. The division by $v_C$ normalizes and helps to balance the slope whose absolute value is much lower in $v_C < v_{MPP}$ than in $v_C > v_{MPP}$. However, $v_C$ is positive in the whole operating region, and thus this division does not affect the sign of the slope. The operation of the exemplary method is based on the information of the sign of such a slope.

As shown in FIG. 6, the obtained derivative is used in the PI plus feedforward controller, where $k_p$ and $k_i$ are the proportional and integral gains in blocks 201 and 202, respectively. The results from the blocks 201 and 202 are subtracted from the calculated power signal p to produce a signal P, which is the outcome of the MPPT and can be used as a reference value for the amplitude of the output current, as explained above.

Figure 7:
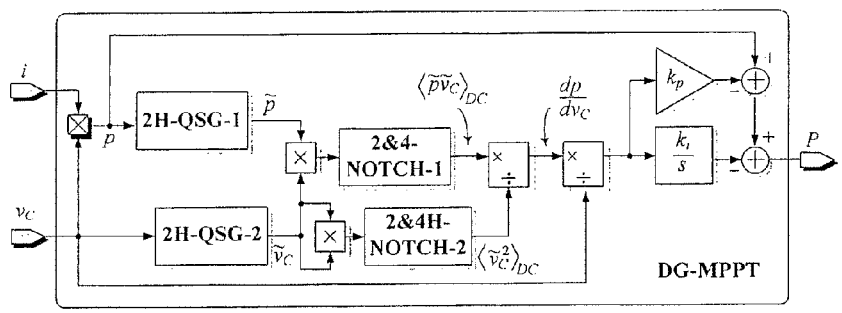
FIG. 7 shows DG-MPPT for a single-stage inverter in accordance with an exemplary embodiment.

The estimation of the derivative $$\frac{dp}{dv_c}$$

is based on the information provided by the $2^{nd}$ harmonic component of the fluctuation present in both power and voltage, $\tilde{p}$ and $\tilde{v}_C$, respectively. These harmonic components are then processed as shown in the more detailed diagram of the DG-MPPT shown in FIG. 7. FIG. 7 shows DG-MPPT for a single-stage inverter in accordance with an exemplary embodiment.

The above exemplary MPPT based on the concept of direct-gradient can be referred to as a DG-MPPT. This method can provide fast response in case of rapid changes in irradiation and temperature and can be used in connection with a single-phase grid connection. The exemplary DG-MPPT of the present disclosure includes reconstruction of the rate of change of PV power with respect to PV voltage (dp/dv), which is later integrated to directly generate the power reference. For the reconstruction of dp/dv the harmonic ripple present in those two signals can be extracted and correlated. In an exemplary embodiment having a single-stage case, PV signals can be naturally perturbed by a second harmonic caused by the fluctuating delivered power. That is, the exemplary DG-MPPT of the present disclosure can use this second harmonic ripple already contained in the PV signals rather than introducing additional perturbation as in known MPPT methods. The exemplary DG-MPPT uses the measurement of both PV voltage and PV current, where the latter can be specified for the computation of the PV power. In the exemplary DG-MPPT, the $2^{nd}$ harmonic components of both PV power p and capacitor voltage $v_C$ are estimated, which were referred as $\tilde{p}$ and $\tilde{v}_C$, respectively, as shown in FIG. 7.

The exemplary DG-MPPT with current measurement is explained only for better understanding of the present disclosure, in which the measurement of PV current is not needed.

Figure 8:
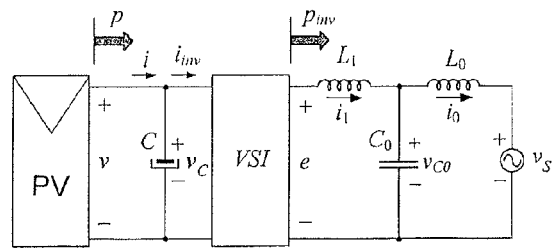
FIG. 8 shows a single-phase single-stage inverter grid-connected through an LCL filter in accordance with an exemplary embodiment.

FIG. 8 shows a single-phase single-stage inverter grid-connected through an LCL filter in accordance with an exemplary embodiment. The mathematical model of the capacitor on the DC side of the VSI of FIG. 8 can be obtained as a power balance in the following form $$v_C C \dot{v}_C = v_C i - e i_1 \qquad (6)$$

where $v_C$ is the voltage in the capacitor connected in parallel to the PV, and thus, $v_C = v$; i is the current of the PV; e is the injected voltage, which is generated by the VSI; $i_{inv}$ is the current on the inverter DC side; $i_1$ is the current on the inverter AC side, which is equal to the current on the inductor $L_1$.

And for the LCL filter on the AC side of the inverter the model is $$\begin{aligned} L_1 \dot{i}_1 &= -v_{C0} + e \\ C_0 \dot{v}_{C0} &= i_1 - i_0 \\ L_0 \dot{i} &= v_{C0} - v_s \end{aligned} \qquad (7)$$

where $i_0$ is the current of inductor $L_0$, also referred as current on the grid side; $v_{C0}$ is the voltage in the capacitor $C_0$; and $v_S$ is the grid voltage.

It can be assumed that the VSI has no losses, and thus, the power at its input equals the power delivered at its output.

Moreover, in the description that follows it is assumed that e is a known signal coming out of the grid controller. A grid controller is a device which synchronizes the operation of the inverter with the grid voltage and produces switching sequences for the switching devises in the VSI.

Model (6)-(7) and the exemplary embodiments that follow hold for different topologies of inverters, as only the modulation signal e has been considered. Out of this signal, and depending on the topology selected, the switching sequences can be generated using a suitable modulation algorithm.

In another exemplary embodiment of the present disclosure, PV current is not measured. Instead of estimating the PV current based on a model of the system, the $2^{nd}$ harmonic component of the PV power p is indirectly reconstructed using the information of the power in the inverter AC side, that is, the power given by $p_{inv} = ei_1$. Notice that $p_{inv}$ can be obtained as the product of two known signals.

To facilitate the design, consider the following transformation $$z = \frac{v_c^2}{2} \quad (8)$$

Out of which the model gets the form $$C\dot{z} = p - ei_1 \quad (9)$$

where we have used the fact that $p = v_c i$, which represents the power delivered by the PV. Notice that with this transformation, the MPP, originally at $[p_{MPP}, v_{MPP}]$, has been mapped to the point $[p_{MPP}, z_{MPP}]$. Based on transformation (8) a new (power to z variable) pz-characteristic curve can be obtained preserving the same convexity of the original (power to voltage) pv-characteristic curve. Moreover, the MPP is also reached whenever the power reaches $p_{MPP}$. Roughly speaking, it is equivalent to use variable z to search the MPP in this new pz-characteristic curve, as using the voltage variable $v_C$ in the pv-characteristic curve.

Figure 9:
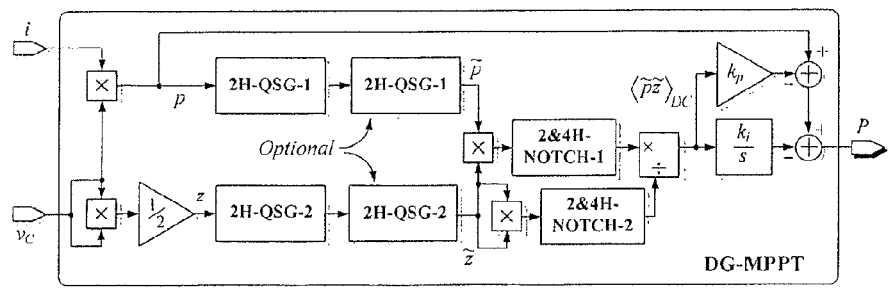
FIG. 9 shows an alternative implementation of the DG-MPPT for single-phase single-stage inverter in accordance with an exemplary embodiment.

FIG. 9 shows an alternative implementation of the DG-MPPT for single-phase single-stage inverter in accordance with an exemplary embodiment. Based on the model description (9), the DG-MPPT can also be realized using the new variable z. In this exemplary embodiment the DG-MPPT is the base for the current sensorless method. In the context of the present disclosure, the notation $\langle x \rangle_k$ is used as the operator that extracts the k-th harmonic component of variable x. For instance, $\langle x \rangle_2$ is the operator that extracts the $2^{nd}$ harmonic component of x. All along the paper we use indistinctly $\langle x \rangle_0$ or $\langle x \rangle_{DC}$ to represent the operator that extracts the DC component of signal x.

The measurement of the PV current can be substituted by estimations using available information. For example, the $2^{nd}$ harmonic component can be extracted on both sides of (9), i.e., after application of operator $\langle \cdot \rangle_2$ to obtain $$\langle C\dot{z} \rangle_2 = \langle p - ei_1 \rangle_2 = \langle p \rangle_2 - \langle ei_1 \rangle_2 \quad (10)$$

Solving for $\langle p \rangle_2$ yields $$\langle p \rangle_2 = C \langle \dot{z} \rangle_2 + \langle ei_1 \rangle_2 \quad (11)$$

where linearity of the operator $\langle \cdot \rangle_2$ has been assumed.

In an exemplary embodiment, the $2^{nd}$ harmonic component of the PV power can be obtained by adding the $2^{nd}$ harmonic components of both the power in AC inverter side $p_{inv}$ and the power handled by the capacitor C, with the advantage that the current on the DC side is no longer necessary. These harmonic components can be estimated by using, for instance, the band-pass filters (BPF) 2H-QSG shown in FIG. 10, which are quadrature signal generators (QSG) tuned at the $2^{nd}$ harmonic of the fundamental.

Figure 10:
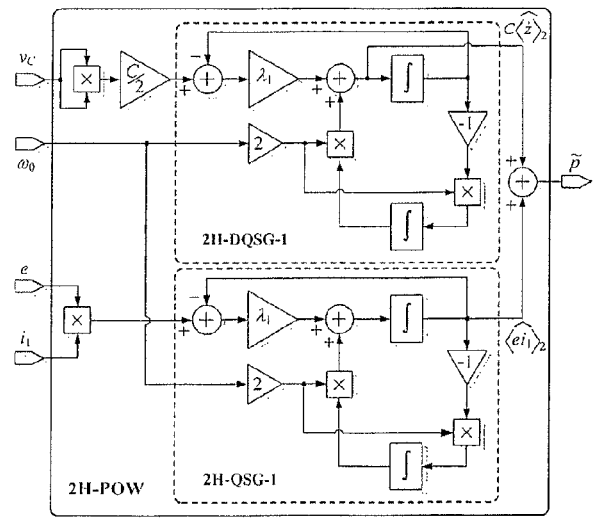
FIG. 10 shows an estimator of the $2^{nd}$ harmonic component of the PV power $\tilde{p}$ (2H-POW) in accordance with an exemplary embodiment.

The estimate of $\langle p \rangle_2$ can be used in the place of $\tilde{p}$, which appeared in the exemplary DG-MPPT of FIG. 9 based on current measurement. FIG. 10 shows an estimator of the $2^{nd}$ harmonic component of the PV power $\tilde{p}$ (2H-POW) in accordance with an exemplary embodiment. FIG. 10 shows the block diagram of the proposed estimator, referred as 2H-POW, used to reconstruct $\tilde{p}$. This estimator uses mainly two 2H-QSG to reconstruct the $2^{nd}$ harmonic components $\langle \dot{z} \rangle_2$ and $\langle ei_1 \rangle_2$. They are referred as 2H-DQSG-1 and 2H-QSG-1, respectively.

As shown in FIG. 10, block 2H-DQSG-1 receives the calculated variable z as input together with the fundamental frequency of the grid voltage $\omega_0$ which can be obtained with an external phase locked loop (PLL), for example. Block 2H-QSG-1 receives the same frequency and the product $ei_1$. The frequency response of 2H-DQSG-1 and 2H-QSG-1 comprises (e.g., consists) of a very narrow resonant peak tuned at twice the fundamental frequency. These very selective estimators can thus be used as effective estimators of the second harmonic component with a relatively fast response.

The output of the integrator on the top of 2H-DQSG-1 in FIG. 10 is the estimate of the $2^{nd}$ harmonic of the input signal. Therefore, the input to such integrator should be the time derivative of this $2^{nd}$ harmonic component estimate, $$i.e., \frac{d}{dt}$$

$(i \langle z \rangle_2)$. In other words, the time derivative of the estimate of the $2^{nd}$ harmonic component can be available from the 2H-DQSG-1. Here $\langle \dot{z} \rangle_2$ is reconstructed by using such available signal $$\frac{d}{dt}$$

$\langle z \rangle_2$). According to (10), the gain $\lambda_1$ should be the same in both 2H-DQSG-1 and 2H-QSG-1.

For the estimation of $\langle \dot{z} \rangle_2$ it can be assumed that both the operators $\langle \cdot \rangle_2$ and $$\frac{d}{dt}$$

commute. This assumption is valid if the fundamental frequency $\omega_0$ varies relatively slow. As a result, the QSG is almost linear.

The $2^{nd}$ harmonic component of the variable z, i.e., $\langle z \rangle_2$ can be estimated as in the exemplary DG-MPPT of FIG. 9, that is, by using yet another QSG tuned at the $2^{nd}$ harmonic to get $\tilde{z}$. This QSG is a similar band-pass filter as the 2H-QSG-1 of FIG. 10 and is referred as 2H-QSG-2 in FIGS. 10 and 11.

Figure 11:
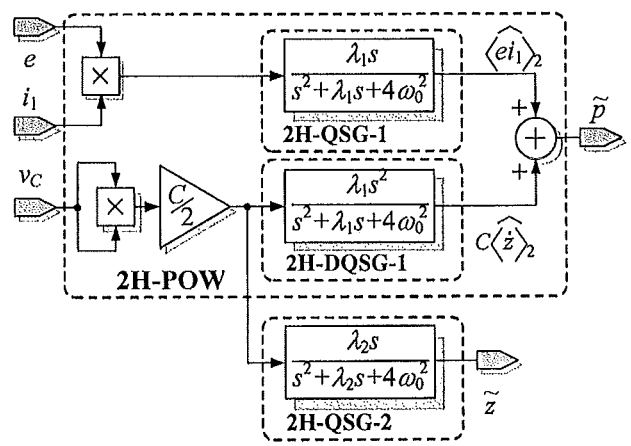
FIG. 11 shows a simplification to the estimator of the $2^{nd}$ harmonic component of the PV power p and variable z in accordance with an exemplary embodiment.

FIG. 11 shows a simplification to the estimator of the $2^{nd}$ harmonic component of the PV power p and variable z in accordance with an exemplary embodiment. In another exemplary embodiment, the fundamental frequency $\omega_0$ is a known constant, then the estimators of the $2^{nd}$ harmonic component of power p and variable z represented by $\tilde{p}$ and $\tilde{z}$, respectively, can be reduced to simple BPFs as shown in FIGS. 10 and 11.

In the exemplary DG-MPPT with current measurement shown in FIG. 9, the PV power p can be used as a feedforward term, however, this signal is no longer available. According to an exemplary embodiment, the DC component of p is reconstructed by means of another estimator, and this estimate is used as feedforward term.

Considering the above model (9), the DC component of p, referred as $\bar{p}=\langle p \rangle_0$, is assumed to be an unknown constant. Based on the structure of model (9), the following estimator can be structured, which is referred as DC-POW $$C\dot{\hat{z}} = \bar{p} - ei_1 + \lambda_0(z-\hat{z})$$

$$p\dot{\bar{p}} = \gamma_0(z-\hat{z}) \qquad (12)$$

where $\lambda_0 > 0$ and $\gamma_0 > 0$ are two design parameters; $\hat{z}$ and $\bar{p}$ represent the estimates of z and $\bar{p}$, respectively. According to another exemplary embodiment, the estimate $\bar{p}$ can be used as the feedforward term for the PI in the exemplary DG-MPPT-iless. This feedforward term improves the dynamic performance of the exemplary DG-MPPT-iless.

Figure 12:
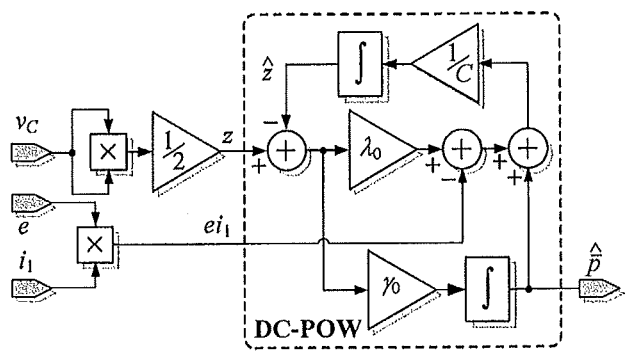
FIG. 12 shows an estimator of the DC component of the PV power (DC-POW) in accordance with an exemplary embodiment.
Figure 13:
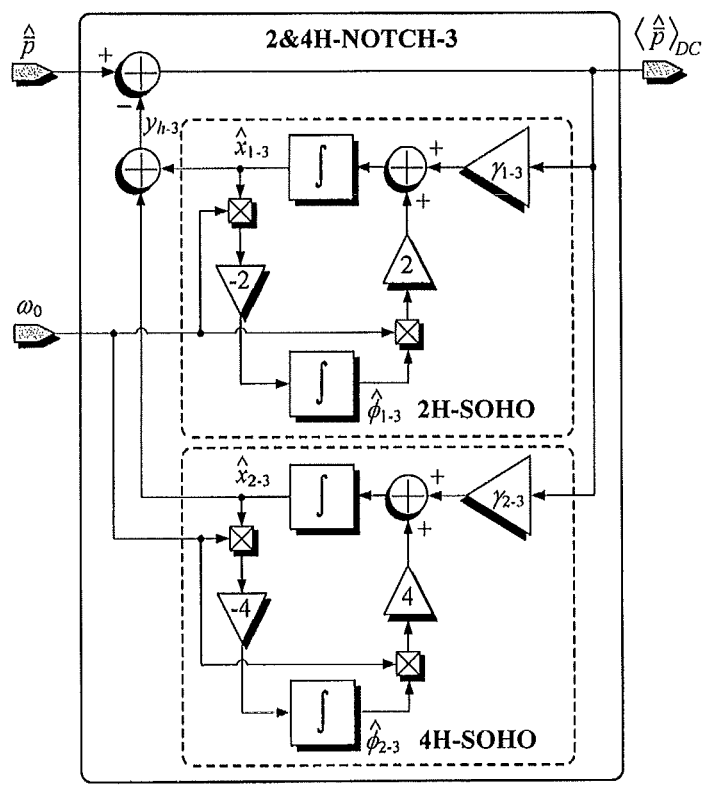
FIG. 13 shows a notch filter used to cancel out the $2^{nd}$ and the $4^{th}$ harmonic components in accordance with an exemplary embodiment.

FIG. 12 shows an estimator of the DC component of the PV power (DC-POW) in accordance with an exemplary embodiment, and FIG. 13 shows a notch filter used to cancel out the $2^{nd}$ and the $4^{th}$ harmonic components in accordance with an exemplary embodiment. In an exemplary embodiment of the present disclosure, $2^{nd}$ and $4^{th}$ harmonic components are filtered out before using the signal as the feedforward signal. This filtering is performed, for example, by means of a notch filter of the form 2&4-NOTCH-1 as shown in FIG. 13, thus avoiding a reinjection of harmonic distortion to the construction of P. A block diagram of this estimator is presented in FIG. 12 and it is based on the equation (12).

The exemplary notch filter discussed above comprises (e.g., consists of) an estimator for the harmonic distortion $y_h$, which in this case includes the $2^{nd}$ and $4^{th}$ harmonic components. This estimated disturbance $y_h$ is then subtracted from the overall polluted signal $\bar{p}$ as shown in FIG. 13, thus yielding the DC component. The estimator can be composed of two second-order harmonic oscillators (SOHO) tuned at the $2^{nd}$ (2H-SOHO) and $4^{th}$ harmonics (4H-SOHO), where $\gamma_1$ and $\gamma_2$ are two positive design parameters that simultaneously fix the gain and the quality factor of the notch filters.

Figure 14:
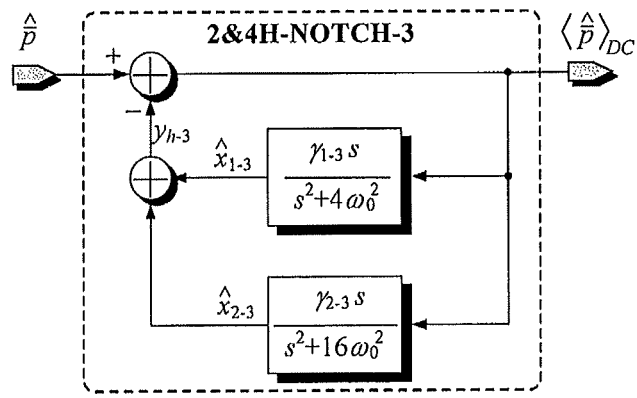
FIG. 14 shows a simplification shows of the exemplary notch filter of FIG. 13 in accordance with an exemplary embodiment.

In the case of a well known and constant fundamental frequency $\omega_0$, the structure of FIG. 13 can be reduced to a structure shown in FIG. 14. Thus FIG. 14 shows a simplification shows of the exemplary notch filter of FIG. 13 in accordance with an exemplary embodiment.

Figure 15:
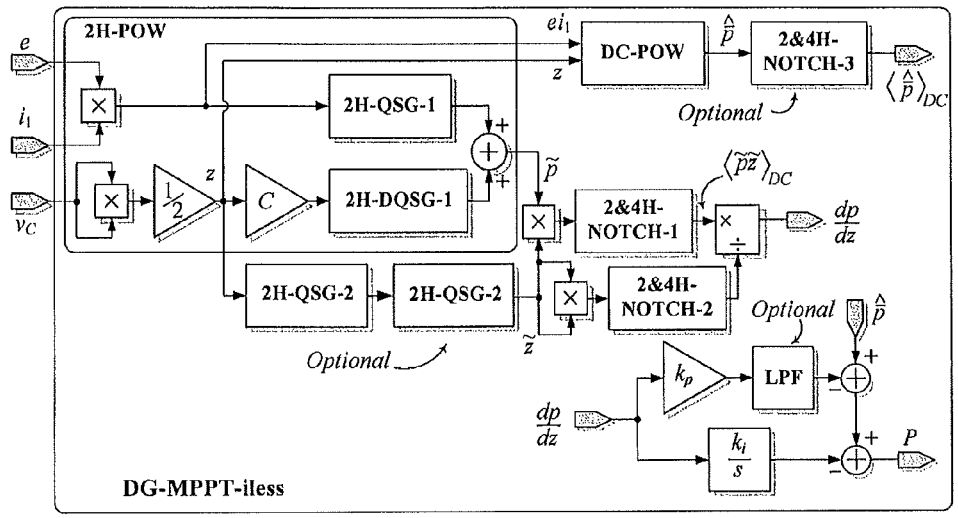
FIG. 15 shows a first DG-MPPT-iless in accordance with an exemplary embodiment.

FIG. 15 shows a first DG-MPPT-iless in accordance with an exemplary embodiment. An exemplary method associated with the modified DG-MPPT-iless method comprises the estimator 2H-POW for $\tilde{p}$, the estimator DC-POW for the DC component of power $\bar{p}$, and uses variable z in the place of the capacitor voltage $v_C$.

It can be shown that the DG-MPPT-iless scheme is robust with respect to uncertainties in the capacitance C. For example, the DC component of the product of both disturbances $\tilde{p}$ and $\tilde{z}$, which is used as an estimation of $$\frac{dp}{dz}$$

in the DG-MPPT-iless, can be computed as follows $$\langle \tilde{p}\tilde{z}\rangle_0 = \langle (C\langle \dot{z}\rangle_2 + \langle ei_1\rangle_2)\langle z\rangle_2\rangle_0 \qquad (13)$$

$$= \langle C\langle \dot{z}\rangle_2\langle z\rangle_2\rangle_0 + \langle\langle ei_1\rangle_2\langle z\rangle_2\rangle_0$$

$$\cong \langle\langle ei_1\rangle_2\langle z\rangle_2\rangle_0$$

where the term $\langle C\rangle\dot{z}\langle_2\rangle z\langle_2\rangle_0$ vanishes as it is the product of two signals having a phase shift difference of 90 degrees. This produces mainly higher order harmonics, which are filtered out, with no DC component. In other words, the DG-MPPT-iless method is robust with respect to uncertainties in the capacitor C as the term associated to C vanishes in the steady state during the extraction of the DC component of the product $\tilde{p}\tilde{z}$. Based on this exemplary technique, the term associated to C could be eliminated from the exemplary DG-MPPT-iless of the present disclosure. However, this term can prevent higher transients, and thus, it can have a positive effect on the dynamic response.

On the other hand, it has been observed that uncertainties in the capacitance C can produce higher distortion in the estimate $\tilde{p}$, mainly composed of $2^{nd}$ and $4^{th}$ harmonics. Therefore, an extra notch filter of the form 2&4-NOTCH-3 to $\tilde{p}$ is included, as shown in FIG. 15, before using it as a feedforward term.

As shown in FIG. 15 a low pass filter can also be included to the design together with the proportional term $k_p$ of the PI controller. This modification can alleviate the ripple in the modulation amplitude P. For example, a LPF of the form $$\frac{1}{\tau s + 1},$$

with a time constant $\tau$, can be enough.

Figure 16:
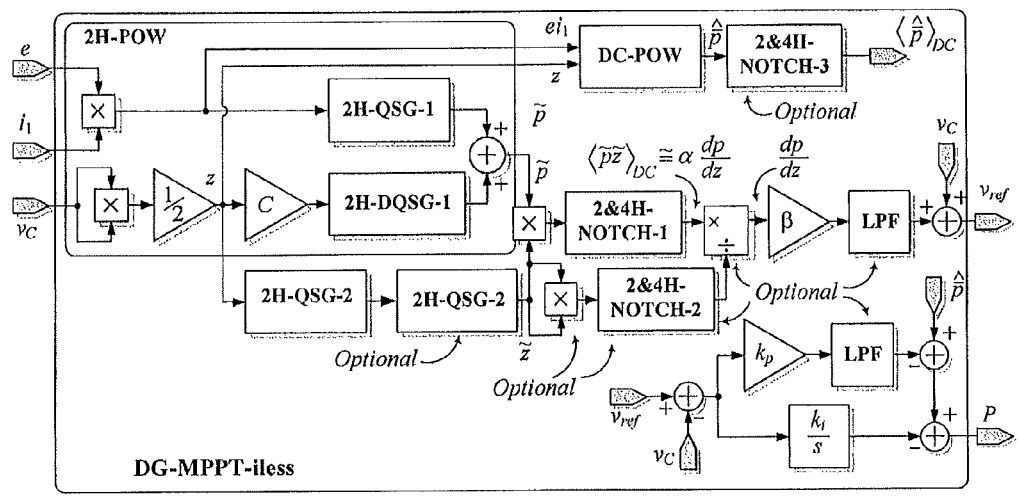
FIG. 16 shows a second DG-MPPT-iless in accordance with an exemplary embodiment of the present disclosure.

Moreover, the exemplary DG-MPPT-iless of FIG. 15 as well as the versions of the exemplary DG-MPPT shown in FIGS. 7 and 9 using current measurement can be re-structured as voltage reference generators, just as known MPPTs. FIG. 16 shows a second DG-MPPT-iless in accordance with an exemplary embodiment of the present disclosure. In this exemplary embodiment, the reference voltage $v_{ref}$ can be defined as follows:

$$v_{ref} = v_C + \beta \frac{dp}{dz} \qquad (14)$$

where $\beta$ is a design parameter.

As a result, the input to the PI controller, originally $$\frac{dp}{dz},$$

can be $$v_{ref} - v_C = \beta \frac{dp}{dz}. \qquad (15)$$

In other words, the exemplary DG-MPPT-iless computes a time varying increment $$\beta \frac{dp}{dz},$$

which is added to the actual capacitor voltage (or PV voltage) $v_C$ to form an intermediate variable referred as the reference voltage $v_{ref}$. The objective of the PI can guarantee that the capacitor voltage $v_C$ follows such a reference $v_{ref}$. The increment depends directly on the rate of change $$\frac{dp}{dz},$$

which has the same sign of $$\frac{dp}{dv_C}.$$

Therefore, the capacitor voltage can reach the MPP following the direction of the gradient.

In an exemplary embodiment, a low pass filter can also be included to filter out additional ripple from signal $$\beta \frac{dp}{dz},$$

and to keep a smooth variation of such increment. For instance a first order filter of the form $$\frac{1}{\tau_2 s + 1},$$

with $\tau_2$ the time constant, would be enough.

Moreover, to guarantee a good performance in a wider range of power, the gain $\beta$ can be made a function of the DC component the estimated power $\tilde{p}$.

An advantage of the exemplary embodiment, where the exemplary DG-MPPT-iless delivers an intermediate reference voltage, is that the exemplary DG-MPPT-iless of the present disclosure can be combined with other known MPPT schemes delivering also a voltage reference. In all these cases, the capacitor voltage can be forced to reach the reference by means of a PI controller as well.

Figure 17:
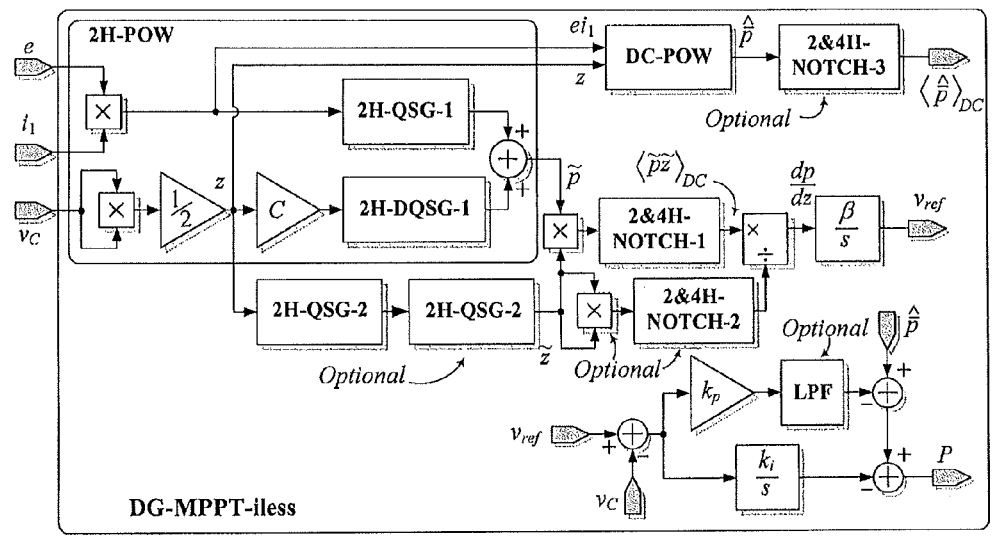
FIG. 17 shows a third DG-MPPT-iless in accordance with an exemplary embodiment.

In another exemplary embodiment, the exemplary DG-MPPT-iless comprises in computing the voltage reference as the integral of $$\frac{dp}{dz}$$

as follows.

$$v_{ref} = \frac{\beta}{s}\left(\frac{dp}{dz}\right) \quad (16)$$

where $\beta$ is a design parameter. In this embodiment the integral term will integrate the variable $$\frac{dp}{dz}$$

to generate the voltage reference $v_{red}$, and the integration process will stop exactly at the point where $$\frac{dp}{dz} = 0,$$

which happens exactly at the MPP. FIG. 17 shows a third DG-MPPT-iless in accordance with an exemplary embodiment.

In other exemplary embodiments of the present disclosure the terms and signals in the DG-MPPT-iless can be eliminated to reduce the complexity of the scheme without compromising the overall performance. For example, the division by $\langle \tilde{z}^2 \rangle_0$ does not affect the sign of $$\frac{dp}{dz},$$

as it only gives an appropriate scaling, which can make the result slightly more linear. Its computation, however, can be extensive, and thus, can be eliminated. The feedforward term allows a faster response during big transients and allows a better tuning of the PI gains. However, during operation in the MPP, and for relatively slow changes in irradiation, this term does not show a considerable effect, and thus it can be eliminated as well.

As above mentioned, the term associated to the capacitor power $\langle C \langle \dot{z} \langle z \rangle_2 \rangle z \rangle_0$ can be eliminated as it vanishes in the steady state. It may be, however, necessary to retune the parameters of the PI scheme to allow a slower response. As a result of all these simplifications, the DG-MPPT-iless can be considerably reduced as observed in the diagram of FIG. 18.

Figure 18:
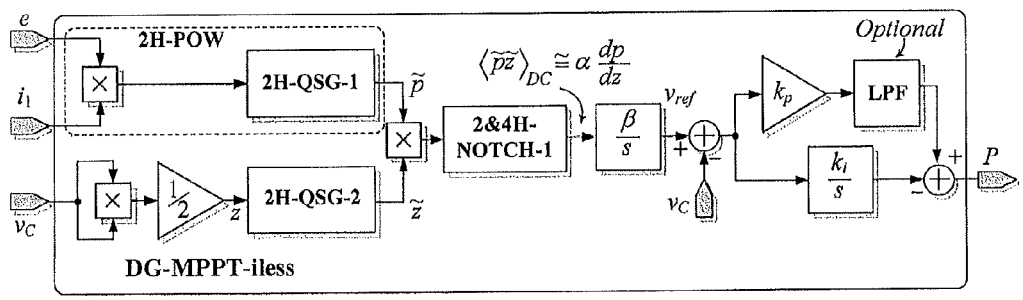
FIG. 18 shows a fourth DG-MPPT-iless in accordance with an exemplary embodiment of the present disclosure.

FIG. 18 shows a fourth DG-MPPT-iless in accordance with an exemplary embodiment. It can be seen from FIG. 18 that the input variables to the system are output voltage of the inverter e, which can be obtained from the grid controller, output current of the inverter $i_1$ and capacitor voltage $v_C$. Power signal p and parameter z can be calculated from these variables. The second harmonic components are extracted from p and z, and these components are multiplied with each other. Further a DC component can be extracted from the obtained product, and this DC component represents derivative of power with respect to variable z.

Figure 19:
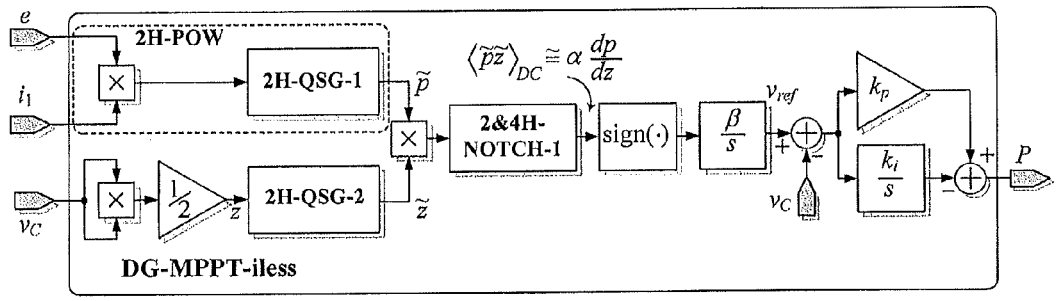
FIG. 19 shows a fifth DG-MPPT-iless in accordance with an exemplary embodiment.

FIG. 19 shows a fifth DG-MPPT-iless in accordance with an exemplary embodiment. FIG. 19 shows yet another exemplary embodiment of a modification to allow uniform growth of the reference voltage $v_{ref}$ in the admissible operation region. For this purpose, a function is included to extract the sign of $$\frac{dp}{dz},$$

which is later integrated. Notice that with this modification, additional slight oscillations are expected once the MPP is reached, as it is usual in high gain controllers.

For the simulation test, the single-phase single-stage PV inverter of FIG. 8 is considered, which is grid-connected through an LCL filter. This system has been designed using the following parameters: $L_1=2$ mH, $L_0=833$ μH, $C_0=10$ μF, $C=2200$ μF. This system includes a string of PV modules producing a power of about $P_{MPP}=2680$ W in the MPP at 1000 W/m² of irradiance and a temperature of 25° C. This corresponds to a voltage in the MPP of about $v_{MPP}=362$ V, and a current of $i_{MPP}=7.36$ A. The grid voltage is a sinusoidal signal with an amplitude of 230 $V_{RMS}$, and a fundamental frequency of $\omega_0=100$ πr/s ($f_0=50$ Hz).

The system is controlled by the DG-MPPT-iless of FIG. 16, plus a suitable grid controller. The proportional and integral gains of the DG-MPPT-iless have been tuned to $k_p=40$ and $k_i=75$. The parameters for the filters 2H-QSG-1, 2H-DQSG-1 and 2H-QSG-2 are tuned to $\lambda_1=\lambda_2=200$, which corresponds to a time response of $T_{\lambda,1}=T_{\lambda,2}=11$ ms. The parameters for the 2&4H-NOTCH-1 are tuned to $\gamma_{1-1}=\gamma_{2-1}=400$, which corresponds to $T_{\gamma 1-1}=T_{\gamma 2-1}=5.5$ ms. In the controller expressions it is assumed that the fundamental frequency is a known constant of $\omega_0=1007$ πr/s. Therefore, we use the implementation of an exemplary reduced DG-MPPT-iless is used. A first order LPF of the form $$\frac{1}{\tau_2 s + 1}$$

has been included to filter the signal $$\beta \frac{dp}{dz}$$

with a constant time of $\tau=0.01$ s. The parameters for the estimator of $\tilde{p}$ have been fixed to $\lambda_0=1000$ and $\gamma_0=20$. A notch filter of the form 2&4-NOTCH-3 has been applied to $\tilde{p}$ prior to using it as a feedforward term, with estimation gains $\gamma_{1-3}=\gamma_{2-3}=25$. Moreover, no division by $\langle \tilde{z}^2 \rangle_0$ has been used. In its place a gain β in function of the estimated power $\tilde{p}$ is used, this gain is about 0.0001 for the maximum power, and about 0.003 for the minimum power.

Figure 20:
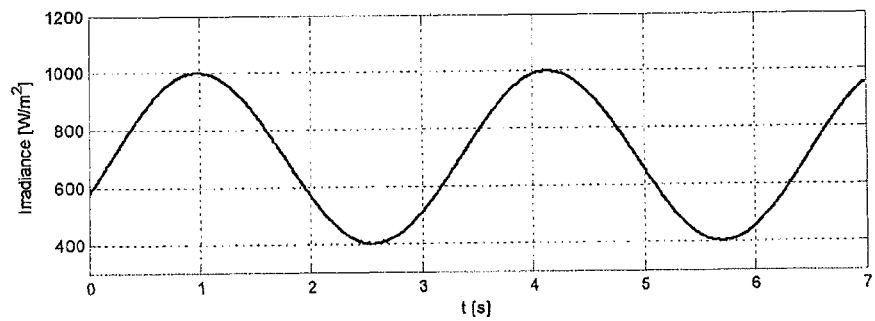
FIG. 20 shows biased sinusoidal irradiation profile for the simulations carried out in accordance with an exemplary embodiment.

FIG. 20 shows biased sinusoidal irradiation profile for the simulations carried out in accordance with an exemplary embodiment. To test the response of the exemplary DG-MPPT-iless of FIG. 16 to irradiation changes, a profile for the irradiation has been proposed in such a way that the irradiance changes between 400 and 1000 W/m² following the shape of a biased sinusoidal function at a frequency of 1/π Hz, i.e., G=700 +300 sin(2t+φ)W/m², as shown in FIG. 20. The cell temperature has been fixed to 25° C.

Figure 21:
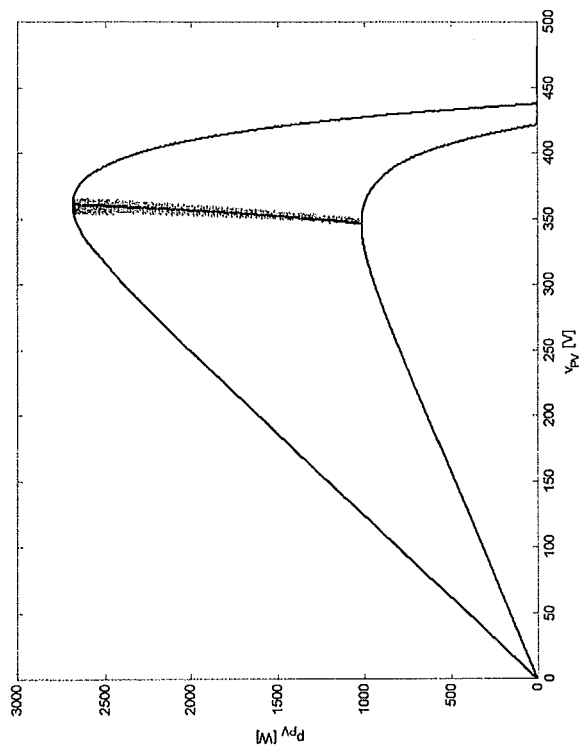
FIG. 21 shows the MPP tracking capability of the proposed DG-MPPT-iless when the irradiation is changed from 400 to 1000 W/m$^2$ following the biased sinusoidal shape in accordance with an exemplary embodiment.
Figure 21:
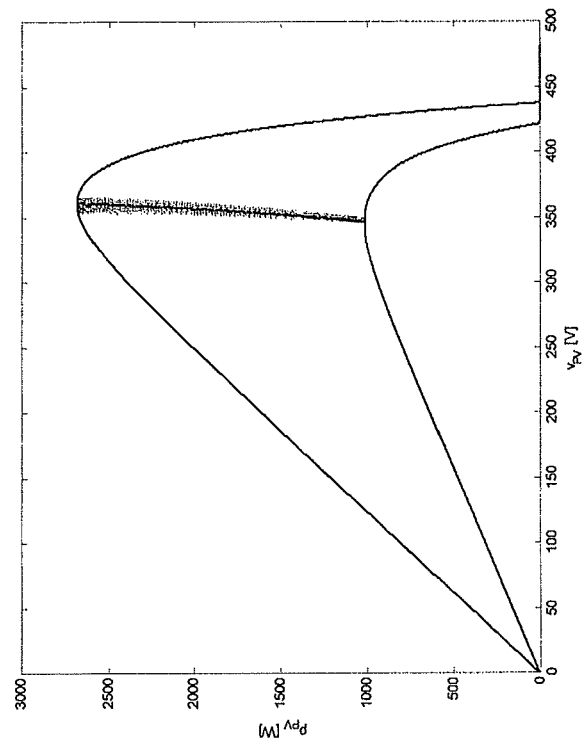

FIG. 21 shows the MPP tracking capability of the proposed DG-MPPT-iless when the irradiation is changed from 400 to 1000 W/m² following the biased sinusoidal shape in accordance with an exemplary embodiment. On the left side is the result considering the correct value of C in the controller, i.e., 2200 μF, while on the right is the result considering a 20% mismatch, i.e., 1760 μF. The set of available MPPs at the different radiations can be represented by the gray line in the middle of the actual response in black. Therefore, the PV generated power is very close to the maximum available power in average.

Figure 22:
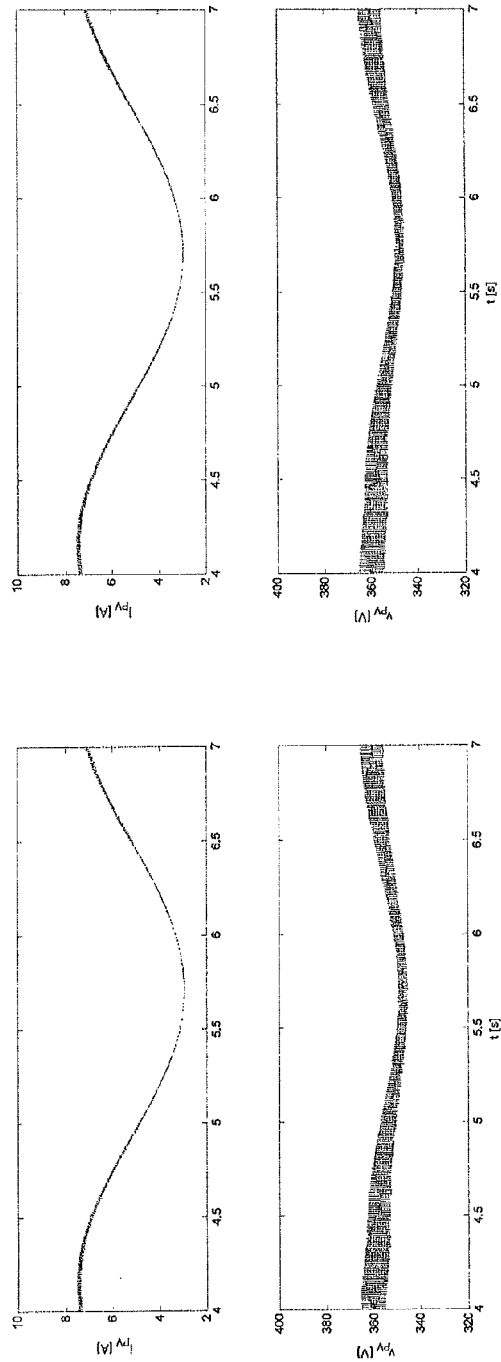
FIG. 22 shows the responses of the (top) PV current and (bottom) PV voltage in accordance with an exemplary embodiment.

FIG. 22 shows the responses of the (top) PV current and (bottom) PV voltage in accordance with an exemplary embodiment. On the left side the responses considering the correct C in the controller expressions, while on the right a mismatch of 20% has been used. Both responses are very similar.

Figure 23:
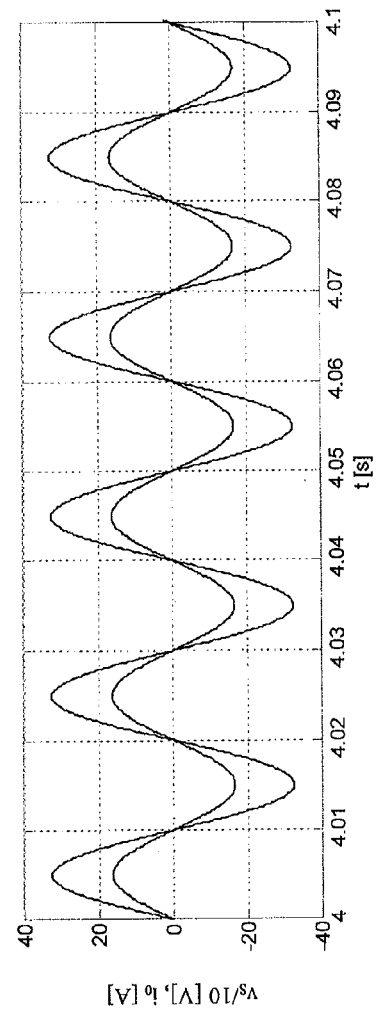
FIG. 23 shows the responses of the grid side current $i_0$ and the scaled grid voltage $v_S/10$ in accordance with an exemplary embodiment.

FIG. 23 shows the responses of the grid side current $i_0$ and the scaled grid voltage $v_s/10$ in accordance with an exemplary embodiment. Both are sinusoidal signals in phase, thus, operation with a power factor (PF) close to one is guaranteed.

Figure 24:
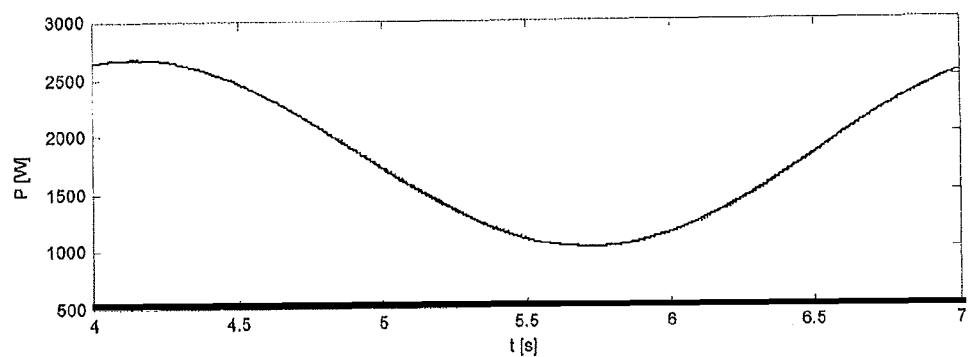
FIG. 24 shows the response of the modulation amplitude P used to compute the grid side current reference $$i_0^* = \frac{Pv_S}{v_{S,RMS}^2}$$

FIG. 24 shows the response of the modulation amplitude P used to compute the grid side current reference $$i_0^* = \frac{Pv_S}{v_{S,RMS}^2}$$

in accordance with an exemplary embodiment. This signal has an almost imperceptible ripple, and thus, no further deformation is expected in the grid side current $i_0$, thus guaranteeing a low total harmonic distortion (THD).

In the above, the photovoltaic system is described as having a photovoltaic module. The term "module" should be interpreted broadly as a photovoltaic module consisting of any number of cells, modules, strings or arrays.

It will be obvious to a person skilled in the art that, as the technology advances, the inventive concept can be implemented in various ways. The disclosure and its embodiments are not limited to the examples described above but may vary within the scope of the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of tracking a maximum power point of a photovoltaic module, comprising:
    measuring output voltage ($v_C$) of the photovoltaic module;
    determining output voltage (e) of an inverter connected to the photovoltaic module;
    measuring output current ($i_1$) of the inverter connected to the photovoltaic module;
    defining a variable (z) relating to energy of a capacitor using the measured PV module output voltage;
    extracting a second harmonic component ($\tilde{z}$) from the defined variable (z);
    estimating a second harmonic component ($\tilde{p}$) of module output power (p) using the defined variable (z), measured output current ($i_1$) of the inverter, and the determined output voltage (e) of the inverter;
    multiplying the extracted ($\tilde{z}$) and the estimated ($\tilde{p}$) second harmonic components;
    extracting a DC component ($\langle \tilde{p}\tilde{z} \rangle_{DC}$) from a product ($\tilde{p}\tilde{z}$) of the multiplication of the second harmonic components; and
    forming a control signal (P;$v_{ref}$) for controlling the inverter connected to the photovoltaic module by using the extracted DC component in a PI algorithm.

2. The method according to claim 1, wherein forming the control signal (P) comprises:
    estimating a DC component ($\bar{p}$) of the power of the module from the output voltage of the photovoltaic module, output voltage of the inverter, and output current of the inverter;

using the estimated DC component ($\bar{p}$) of the power (p) of the module as a feedforward signal, subtracting the output of the PI algorithm from the feedforward signal, and using the control signal (P) as a current amplitude reference.

3. The method according to claim 1, wherein forming the control signal ($v_{ref}$) comprises:
multiplying the extracted DC component ($\langle \tilde{p}\tilde{z} \rangle_{DC}$) with a constant ($\beta$); and
adding the output voltage ($v_C$) of the photovoltaic module to the obtained product for producing a control signal ($v_{ref}$).

4. The method according to claim 3, wherein the method comprises
using the control signal ($v_{ref}$) as a voltage reference for the inverter for controlling the output voltage of the photovoltaic module.

5. The method according to claim 3, wherein the method comprises:
using the control signal ($v_{ref}$) as an input to a PI algorithm for obtaining control signal (P) for controlling the current amplitude of the photovoltaic module.

6. The method according to claim 1, wherein forming the control signal ($v_{ref}$) comprises:
taking the sign of the extracted DC component ($\langle \tilde{p}\tilde{z} \rangle_{DC}$);
multiplying the sign with a constant ($\beta$); and
adding the output voltage ($v_C$) of the photovoltaic module to the obtained product for producing control signal ($v_{ref}$).

7. The method according to claim 1, wherein forming the control signal ($v_{ref}$) comprises:
integrating the extracted DC component ($\langle \tilde{p}\tilde{z} \rangle_{DC}$); and
multiplying this integral with a constant ($\beta$) for producing control signal ($v_{ref}$).

8. The method according to claim 1, wherein forming the control signal (P) comprises:
calculating a square of the second harmonic component of a variable relating to energy of the capacitor;
extracting a DC component from the calculated square;
dividing the DC component of the product of second harmonic components of variable (z) and power of the module with a DC component of the square of the second harmonic of variable (z), and
feeding a result of the division to the PI algorithm for obtaining the control signal (P).

9. The method according to claim 1, wherein the variable (z) relating to energy of the capacitor is defined as square of the capacitor voltage divided by two $$\left( z = \frac{v_C^2}{2} \right).$$

10. An arrangement for tracking a maximum power point of a photovoltaic module, the arrangement comprising:
means for measuring output voltage ($v_C$) of the photovoltaic module;
means for determining output voltage (e) of an inverter connected to the photovoltaic module;
means for measuring output current ($i_1$) of the inverter connected to the photovoltaic module;
means for defining a variable (z) relating to energy of a capacitor using the measured PV module output voltage;
means for extracting a second harmonic component ($\tilde{z}$) from the defined variable (z);

means for estimating a second harmonic component ($\tilde{p}$) of module output power (p) using the defined variable (z), measured output current ($i_1$) of the inverter and the determined output voltage (e) of the inverter;
means for multiplying the extracted ($\tilde{z}$) and the estimated ($\tilde{p}$) second harmonic components;
means for extracting a DC component ($\langle \tilde{p}\tilde{z} \rangle_{DC}$) from a product ($\tilde{p}\tilde{z}$) of the multiplication of the second harmonic components; and
means for forming a control signal (P;$v_{ref}$) for controlling the inverter connected to the photovoltaic module by using the extracted DC component in a PI algorithm.

11. A photovoltaic inverter comprising the arrangement of claim 10.

12. A method of tracking a maximum power point of a photovoltaic module, comprising:
measuring output voltage ($v_C$) of the photovoltaic module;
determining output voltage (e) of an inverter connected to the photovoltaic module;
measuring output current ($i_1$) of the inverter connected to the photovoltaic module;
defining a variable (z) relating to energy of a capacitor using the measured PV module output voltage;
processing the defined variable (z), measured output current ($i_1$) of the inverter, and the determined output voltage (e) of the inverter to obtain second harmonic components ($\tilde{z}$), ($\tilde{p}$) of the defined variable and module output power (p), respectively;
extracting a DC component ($\langle \tilde{p}\tilde{z} \rangle_{DC}$) from a product ($\tilde{p}\tilde{z}$) of the second harmonic components; and
forming a control signal (P;$v_{ref}$) for controlling the inverter connected to the photovoltaic module based on the extracted DC component.

13. The method according to claim 12, wherein processing step comprises:
extracting a second harmonic component ($\tilde{z}$) from the defined variable (z).

14. The method according to claim 12, wherein the processing step comprises:
estimating a second harmonic component ($\tilde{p}$) of module output power (p) using the defined variable (z), measured output current ($i_1$) of the inverter, and the determined output voltage (e) of the inverter.

15. The method according to claim 12, comprising:
multiplying the extracted ($\tilde{z}$) and the estimated ($\tilde{p}$) second harmonic components.

16. The method according to claim 12, wherein the control signal (P;$v_{ref}$) is formed by using the extracted DC component in a PI algorithm.

17. The method according to claim 16 comprising:
estimating a DC component ($\bar{p}$) of the power of the module from the output voltage of the photovoltaic module, output voltage of the inverter, and output current of the inverter;
using the estimated DC component ($\bar{p}$) of the power (p) of the module as a feedforward signal, subtracting the output of the PI algorithm from the feedforward signal, and using the control signal (P) as a current amplitude reference.

18. The method according to claim 12, wherein forming the control signal ($v_{ref}$) comprises:
multiplying the extracted DC component ($\langle \tilde{p}\tilde{z} \rangle_{DC}$) with a constant ($\beta$); and
adding the output voltage ($v_C$) of the photovoltaic module to the obtained product for producing a control signal ($v_{ref}$).

19. The method according to claim 12, wherein forming the control signal ($v_{ref}$) comprises:
- taking the sign of the extracted DC component ($\langle \tilde{p}\tilde{z} \rangle_{DC}$);
- multiplying the sign with a constant ($\beta$); and
- adding the output voltage ($v_C$) of the photovoltaic module to the obtained product for producing control signal ($v_{ref}$).

20. The method according to claim 12, wherein forming the control signal ($v_{ref}$) comprises:
- integrating the extracted DC component ($\langle \tilde{p}\tilde{z} \rangle_{DC}$); and
- multiplying this integral with a constant ($\beta$) for producing control signal ($v_{ref}$).

* * * * *